(12) United States Patent
Langworthy et al.

(10) Patent No.: US 8,321,833 B2
(45) Date of Patent: Nov. 27, 2012

(54) COMPACT SYNTAX FOR DATA SCRIPTING LANGUAGE

(75) Inventors: David E. Langworthy, Kirkland, WA (US); Bradford H. Lovering, Seattle, WA (US); Donald F. Box, Yarrow Point, WA (US); Giovanni M. Della-Libera, Seattle, WA (US); Jeffrey S. Pinkston, Draper, UT (US); Jeffrey C. Schlimmer, Bellevue, WA (US); John D. Doty, Seattle, WA (US); John L. Hamby, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 12/244,949

(22) Filed: Oct. 3, 2008

(65) Prior Publication Data

US 2010/0088672 A1 Apr. 8, 2010

(51) Int. Cl.
*G06F 9/44* (2006.01)

(52) U.S. Cl. ......... 717/106; 717/114; 717/115; 717/117

(58) Field of Classification Search ......................... None
See application file for complete search history.

(56) References Cited

U.S. PATENT DOCUMENTS

| | | | | |
|---|---|---|---|---|
| 5,815,713 A * | 9/1998 | Sanders | ......................... | 717/106 |
| 6,182,277 B1 * | 1/2001 | DeGroot et al. | ............... | 717/115 |
| 7,006,960 B2 | 2/2006 | Schaumont et al. | | |
| 7,043,487 B2 | 5/2006 | Krishnamurthy et al. | | |
| 7,065,742 B1 * | 6/2006 | Bogdan | ......................... | 717/106 |
| 7,320,122 B2 * | 1/2008 | Chawla et al. | ................. | 717/109 |
| 7,836,428 B2 * | 11/2010 | Mitchell et al. | ............... | 717/117 |
| 8,108,834 B2 * | 1/2012 | Oren et al. | ..................... | 717/117 |
| 2002/0138819 A1 * | 9/2002 | Hills | ............................. | 717/114 |
| 2003/0070158 A1 * | 4/2003 | Lucas et al. | ................... | 717/114 |
| 2003/0208743 A1 * | 11/2003 | Chong et al. | .................. | 717/106 |
| 2004/0225999 A1 * | 11/2004 | Nuss | ............................ | 717/114 |
| 2005/0188350 A1 | 8/2005 | Bent et al. | | |
| 2005/0203958 A1 * | 9/2005 | Mitchell et al. | ............ | 707/104.1 |
| 2006/0031246 A1 | 2/2006 | Grayson | | |
| 2006/0167869 A1 | 7/2006 | Jones | | |
| 2006/0235834 A1 | 10/2006 | Blakeley et al. | | |
| 2007/0250811 A1 * | 10/2007 | Ahs et al. | ...................... | 717/114 |
| 2007/0250821 A1 * | 10/2007 | Mola Marti et al. | .......... | 717/141 |
| 2007/0271548 A1 * | 11/2007 | Chawla et al. | ................. | 717/106 |

(Continued)

OTHER PUBLICATIONS

JL Bergerand, Automatic control systems programming using a real-time declarative language, 1986 plaice.web.cse.unsw.edu.au, pp. 1-12, <http://plaice.web.cse.unsw.edu.au/~plaice/archive/JAP/P-SECOCO86-controlSystems.pdf>.*

(Continued)

*Primary Examiner* — Thuy Dao
*Assistant Examiner* — Cuong V Luu
(74) *Attorney, Agent, or Firm* — Chin IP, PLLC; David Chin

(57) ABSTRACT

The subject disclosure relates to a syntax for a scripting language that allows data intensive applications to be written in a compact, human friendly, textual format. The scripting language can be a declarative programming language, such as the "D" programming language, which is well suited to the authoring of data intensive programs. A compact query syntax is provided for D that simplifies the expression of complex and data intensive programs. In another non-limiting aspect, conventional operator precedence is modified to accommodate the compact syntax and other unique features of a general purpose declarative programming language.

19 Claims, 15 Drawing Sheets

U.S. PATENT DOCUMENTS

| | | | |
|---|---|---|---|
| 2008/0025608 A1* | 1/2008 | Meunier | 382/181 |
| 2008/0120316 A1 | 5/2008 | Vion-Dury et al. | |
| 2008/0133570 A1* | 6/2008 | Allen et al. | 707/102 |
| 2008/0148223 A1* | 6/2008 | Bhandarkar et al. | 717/106 |
| 2008/0168421 A1* | 7/2008 | Meijer et al. | 717/106 |

OTHER PUBLICATIONS

Richard Hull, Heraclitus: Elevating Deltas to be First-Class Citizens in a Database Programming Language, 1996 ACM, pp. 372-426, <http://dl.acm.org/citation.cfm?id=232753.232801>.*

Elvira Albert, A Practical Partial Evaluation Scheme for Multi-Paradigm Declarative Languages, EAPLS 2002, 34 pages, <http://informatik.uni-iel.de/~mh/publications/papers/JFLP02.pdf>.*

Lefteris Virirakis, Genetica: A Computer Language That Supports General Formal Expression With Evolving Data Structures, 2003 IEEE, pp. 456-481, <http://ieeexplore.ieee.org/stamp/stamp.jsp?tp=&arnumber=1237164>.*

Sunit K. Gala, Voltaire: A Database Programming Language with a Single Execution Model for Evaluating Queries, Constraints and Functions, 1993 IEEE, pp. 283-292, <http://ieeexplore.ieee.org/stamp/stamp.jsp?tp=&arnumber=344054>.*

David Lau-Kee, VPL: An Active, Declarative Visual Programming System, 1991 IEEE, pp. 40-46, <http://ieeexplore.ieee.org/stamp/stamp.jsp?tp=&arnumber=238852>.*

Stillhard, Kilian; "A Compact Syntax for XML Schema"; Retrieved at <<ftp://ftp.tik.ee.ethz.ch/pub/ students/2002-2003-Wi/DA-2003-04.pdf>>; Swiss Federal Institute of Technology, Zurich, CH; Mar. 18, 2003; 59 Pages.

Stillhard et al.; "XML Schema Compact Syntax (XSCS) Version 1.0"; Retrieved at <<http://dret.net/netdret/docs/wilde-tikrep166.pdf>>; Swiss Federal Institute of Technology, Zurich, CH; Mar. 2003; 26 pages.

Shipman, John; "Relax NG Compact Syntax (RNC)"; Retrieved at <<http://infohost.nmt.edu/tcc/help/pubs/rnc/rnc. pdf>>; New Mexico Tech Computer Center; Retrieved Date: Feb. 14, 2008; 14 pages.

* cited by examiner

Table Showing "C" Language type Operator Precedence from Top to Bottom

| Category | Operators |
|---|---|
| Grouping, scope, array/member access 100 | () [] -> . :: |
| (most) unary operations, sizeof and type casts 102 | ! ~ - + * & sizeof type cast |
| Multiplication, division, modulo 104 | * / % |
| Addition and subtraction 106 | + - |
| Bitwise shift left and right 108 | << >> |
| Comparisons (less than, ...) 110 | < <= > >= |
| Comparisons: equal or not equal 112 | == != |
| Equality 114 | & |
| Bitwise AND 116 | ^ |
| Bitwise exclusive OR 118 | \| |
| Bitwise inclusive (normal) OR 120 | && |
| Logical AND 122 | && |
| Logical OR 124 | \|\| |
| Ternary operator 126 | ?: |
| Assignment operators 128 | = += -= *= /= %= &= \|= ^= <<= >>= |

FIG. 1
*Prior Art*

Table Showing Operator Precedence from Top to Bottom

| Category | Operators |
|---|---|
| Primary 700 | x,y  f(x) |
| Unary Prefix 702 | +  -  !  ~  identity unique |
| Multiplicity (unary postfix) 704 | ?  +  *  # |
| Multiplicative 706 | *  /  % |
| Additive 708 | +  - |
| Shift 710 | <<  >> |
| Relational and Type Testing 712 | <  >  <=  >=  in x:T |
| Equality 714 | ==  != |
| Bitwise And, Intersection 716 | & |
| Bitwise Exclusive Or 718 | ^ |
| Bitwise Or, Union 720 | \| |
| Logical And (conjunction) 722 | && |
| Logical Or (disjunction) 724 | \|\| |
| Null Coalescing 726 | ?? |
| Conditional 728 | ?: |
| Query Comprehension 730 | from join let where select groupby accumulate |
| Where 732 | where |
| Select 734 | select |

| ORDER | BAR VALUE |
|---|---|
| 1 | A |
| 2 | B |
| 3 | C |

FIG. 12
*Prior Art*

| ID | BAR VALUE |
|---|---|
| XXX | A |
| YYY | B |
| ZZZ | C |

COMPACT SYNTAX FOR DATA SCRIPTING LANGUAGE

TECHNICAL FIELD

The subject disclosure generally relates to a compact, human friendly syntax for a data scripting language for intuitive and efficient development of data processing applications and programs.

BACKGROUND

By way of general background, scripting languages are programming languages that control software systems, applications and programs. Scripts are often treated as distinct from "programs," which execute independently from other applications. In addition, scripts can be distinct from the "core code" of an application, which is typically written in a different language. Scripts can be written by developers or other programs. Where accessible to the end user, scripts enable the behavior of an application to be adapted to the user's needs. Scripts can also be interpreted from source code or "semi-compiled" to bytecode, or another machine friendly format, which is interpreted. Scripting languages can also be embedded in an application with which they are associated.

In this regard, when a large amount of data is stored in a database, such as when a set of server computers collect large numbers of records, or transactions, of data over long periods of time, other computers and their applications may desire access to that data or a targeted subset of that data. In such case, the other computers can use programs developed from scripting languages to query for desired data, read or write to the data, update the data, or apply any other processing to the data, via one or more operators, such as query operators, via a variety of conventional query languages. The amount of data can be voluminous in such circumstances, and the applications that have evolved for consuming the data become quite data intensive. Writing these data intensive applications in a compact, human friendly, textual format has thus far been a challenge.

Historically, relational databases have evolved for this purpose to organize large numbers of records and fields, and have been used for such large scale data collection, and various database query languages such as the structured query language (SQL) and other domain specific languages have developed, which instruct database management software to retrieve data from a relational database, or a set of distributed databases, on behalf of a querying client or application. Yet, by and large, due to the specific purposes for which such languages were developed and the context in which they were meant to operate, among various domain specific limitations, such languages, in a nutshell, have failed to provide sufficient generality and have elevated the importance of syntactically complex constructs and decreased the importance of intuitive expression.

Conventional attempts to develop data intensive applications have included T-SQL and UML.

Transact-SQL (T-SQL) enhances SQL with features such as control-of-flow language keywords for flow control including BEGIN and END, BREAK, CONTINUE, GOTO, IF and ELSE, RETURN, WAITFOR, and WHILE. For instance, IF and ELSE allow conditional execution. BEGIN and END mark a block of statements. WAITFOR waits for a given amount of time, or until a particular time of day and can be used for delays or to block execution until the set time. RETURN is used to immediately return from a stored procedure or function. BREAK ends the enclosing WHILE loop, while CONTINUE causes the next iteration of the loop to execute.

T-SQL includes local variables, so named because they are local to the script executing them; T-SQL does not support user-defined global variables. DECLARE declares a variable, giving it a name and a single set type. The SET statement can be used to provide a value, and the variable may be used in a statement by referencing its name. However, generally speaking, T-SQL is esoteric requiring expert development skill and knowledge of the nuances of T-SQL statements. T-SQL is also not considered compact because many programming statements are typically required even to perform relatively simple tasks.

The unified modeling language (UML) is a standardized general-purpose modeling language in the field of software engineering. UML includes a set of graphical notation techniques to create abstract models of specific systems, referred to as UML model. UML can be used for visualizing, specifying, constructing, and documenting the artifacts of a software-intensive system. UML offers a standard way to write a system's blueprints, including conceptual things such as business processes and system functions as well as concrete things such as programming language statements, database schemas, and reusable software components.

UML is extensible, and while UML is not a method by itself, it was designed to be compatible with various object-oriented software development methods of its time. A UML model can be distinguished from the set of diagrams of a system. A diagram is a partial graphical representation of a system's model. The model also contains a "semantic backplane" which is documentation, such as written use cases, that drive the model elements and diagrams.

UML diagrams represent three different views of a system model: (1) a functional requirements view that emphasizes the functional requirements of the system from the user's point of view, (2) a static structural view that emphasizes the static structure of the system using objects, attributes, operations and relationships, and includes class diagrams and composite structure diagrams, and (3) a dynamic behavior view that emphasizes the dynamic behavior of the system by showing collaborations among objects and changes to the internal states of objects, and includes sequence diagrams, activity diagrams and state machine diagrams.

However descriptive, UML is often criticized for being large and complex, containing many diagrams and constructs that are redundant or infrequently used. Like T-SQL, UML also provides a hurdle in learning and adoption due to the lack of engineers having the requisite skill and understanding. Moreover, the ad hoc mixing of abstract notation, e.g., 2-D ovals, boxes, etc. make UML appear jarring and thus the result is non-uniform and aesthetically displeasing.

By way of further background, an order of precedence for a programming language is a sequential hierarchy of nominal importance of items in the source code. In computer programming, when a number or expression is both preceded and followed by a binary operation, an order of operations rule is required for which operation should be applied first. For instance, multiplication historically has taken precedence over addition, on whichever side of a number it appears. Thus, $3+4\times5=5\times4+3=23$ and parentheses ( ) are typically used to contradict the order of operations rule, e.g., $(3+4)\times5=35$.

Many programming languages use precedence levels that conform to the order commonly used in mathematics, though some, such as APL (A Programming Language), have no operator precedence rules. In APL, evaluation is strictly right to left.

The logical bitwise operators in C, and programming languages that have borrowed precedence rules from C, have a precedence level that some consider to be limited in some ways and difficult to learn. The relative precedence levels of operators found in many C-style languages is shown in FIG. 1. The table of FIG. 1 shows that certain categories take precedence over other categories in the following order from highest priority to lowest: Grouping, scope, array/member access 100, (most) unary operations, size of and type casts 102, Multiplication, division, modulo 104, Addition and subtraction 106, Bitwise shift left and right 108, Comparisons (e.g., less than, greater than . . . ) 110, Comparisons: equal or not equal 112, Equality 114, Bitwise AND 116, Bitwise exclusive OR 118, Bitwise inclusive (normal) OR 120, Logical AND 122, Logical OR 124, Ternary operator 126 and Assignment operators 128. Corresponding operator syntax to the categories appears in the operator column of the table of FIG. 1.

The above-described background information and deficiencies of current programming languages and corresponding systems are merely intended to provide an overview of some of the background information and problems of conventional programming languages, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A syntax for a scripting language is provided in various embodiments that allows data intensive applications to be written in a compact, human friendly, textual format. In one embodiment, the scripting language is a declarative programming language, such as the "D" programming language designed by Microsoft, which is well suited to the authoring of data intensive programs. A compact query syntax is provided for D that simplifies the expression of complex and data intensive programs. In another non-limiting aspect, conventional operator precedence is modified to accommodate the compact syntax and other unique features of a general purpose declarative programming language.

These and other embodiments are described in more detail below.

BRIEF DESCRIPTION OF THE DRAWINGS

Various non-limiting embodiments are further described with reference to the accompanying drawings in which:

FIG. 1 illustrates conventional operator precedence of programming languages adopting operator precedence of the C programming language;

FIG. 7 illustrates operator precedence of a declarative programming language in accordance with various embodiments;

FIG. 12 is an illustration of data storage according to an ordered execution model;

FIG. 13 is a non-limiting illustration of data storage according to an order-independent execution model;

DETAILED DESCRIPTION

Overview

Figure 2:
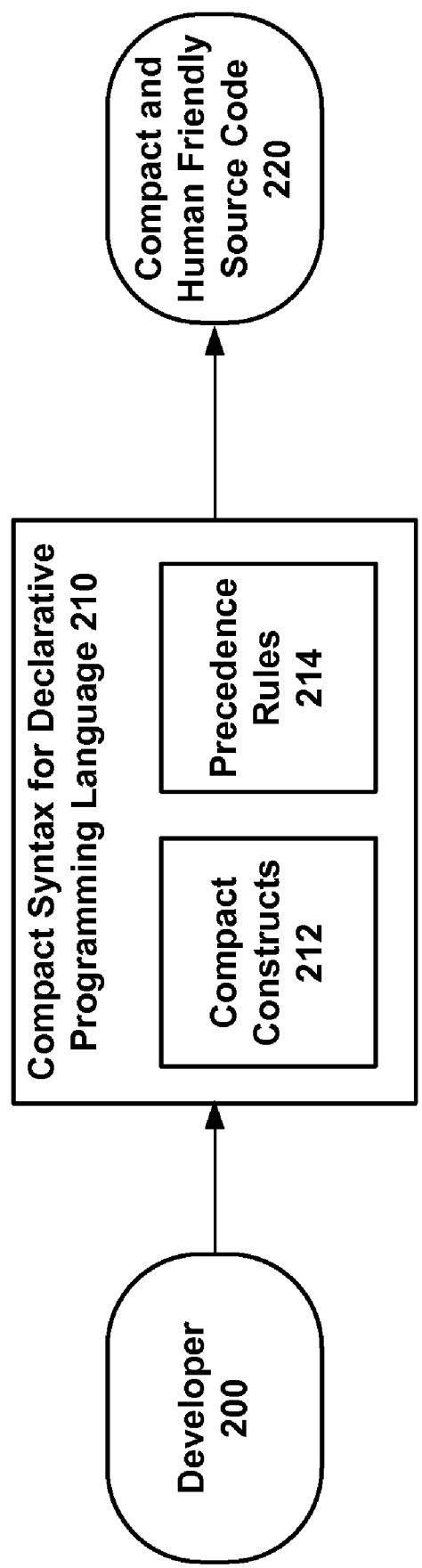
FIG. 2 is a block diagram illustrating non-limiting aspects of a syntax of a programming language in various embodiments.

As discussed in the background, among other things, conventional languages such as T-SQL and UML are generally too complex, requiring significant expertise and many statements to express simple concepts. Accordingly, in various non-limiting embodiments, a compact and human friendly syntax is provided for a declarative data scripting language, such as the D programming language.

In this regard, it is often desirable to author source code in a declarative programming language, considered the counterpart to imperative programming languages. Unlike imperative programming languages, declarative programming languages allow users to write down what they want from their data without having to specify how those desires are met against a given technology or platform.

As described in more detail below, the "D" programming language is a declarative programming language, designed by Microsoft, which is effective for authoring data intensive programs. "D" is also sometimes called the "M" programming language, although for consistency, references to M are not used herein. Some of the syntax of the D is familiar to developers who have used C, C++, C#, or Java programming languages, however, there are various features described below in more detail that distinguish the syntax as more efficient as well.

As a roadmap for what follows, an overview of various embodiments is first presented. Then, some exemplary, non-limiting implementations and optional aspects thereof are discussed in more detail. Next, some supplemental context is provided in connection with declarative programming languages, such as the D programming language. Finally, some exemplary non-limiting network and computing environments in which the techniques described herein can be deployed are set forth, e.g., wherever data may be generated, analyzed, filtered, queried, or otherwise processed for a rich experience over vast stores of networked and standalone data.
Compact Syntax for Data Scripting Language As mentioned, in various non-limiting embodiments, the present invention provides a compact syntax for a declarative programming language, such as the D programming language. D extends query comprehensions of language integrated query (LINQ) language with several features to make authoring queries more concise. For instance, in one aspect, the programming language keywords where and select are available as binary infix operators. Also, indexers are automatically added to strongly typed collections. These features allow common queries to be authored compactly as described in more detail below.

By way of supplemental context, infix notation, as compared to prefix (before operand) and postfix (after operand) is a common arithmetic and logical formula notation in which operators are written infix-style between the operands on which they act (e.g., 2+2). It is not as simple to parse by computers as prefix notation (e.g. +2 2) or postfix notation (e.g. 2 2+), but many programming languages use it due to its familiarity in the context of mathematics.

In infix notation, unlike in prefix or postfix notations, parentheses surrounding groups of operands and operators are typically necessary to indicate the intended order in which operations are to be performed. In the absence of such parentheses, certain precedence rules determine the order of operations. FIG. 1 showed the precedence rules of programming languages adopting C programming language precedence rules.

FIG. 2 is a block diagram illustrating non-limiting aspects of a syntax of a programming language in various embodiments described herein. For instance, a developer 200 using the compact syntax 210 can take advantage of certain compact constructs 212 of the programming language 210 and also take advantage of precedence rules 214 applying to the compact constructs 212, which results in compact and human friendly source code 220. In particular, source code 220 includes constructs that map intuitively to human understanding and constraint based expression over data collections.

Figure 3:
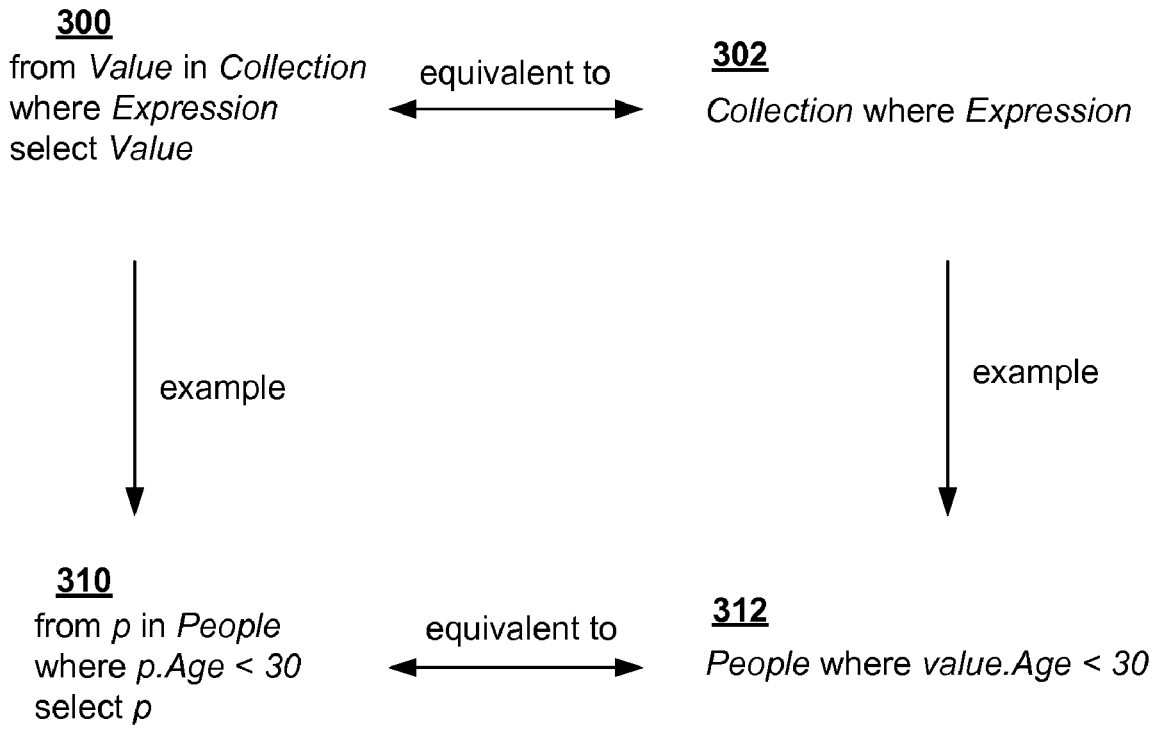
FIG. 3 is illustrative of a compact filtering operation in accordance with a syntax of a programming language in various embodiments.

FIG. 3 is illustrative of a compact filtering operation in accordance with a syntax of a programming language in various embodiments. With respect to filtering operations in D, as an example of where as an infix operator, the following query expression 310 extracts people under 30 years old from a People collection defining a group of persons:

from p in People
   where p.Age<30
   select p

Advantageously, with D, an equivalent compact query can be written with the following expression 312:

People where value.Age<30

In this regard, the where operator takes a collection on the left and a Boolean expression on the right. The "where" operator introduces a keyword identifier value in to the scope of the Boolean expression that is bound to each member of the collection. The resulting collection contains the members for which the expression is true. Thus, expression 302:

Collection where Expression
is exactly equivalent to expression 300:
   from value in Collection
   where Expression
   select value Expression 302, and as an example expression 312, are clearly more compact and intuitive according to human thought and grammar concepts than expressions 300 and 310, respectively, while achieving equivalent functionality. Considering the case of filtering on the value of a single field, the infix where operator can also be used in a query as follows:

People where value.First=="John"

In addition, the D compiler adds indexer members on collections with strongly typed elements. D uses parentheses for indexers rather than square brackets. The collection People is composed of elements of type Person and each element of type person has two fields First and Last of type Text and a field Age of type Number. With respect to its members, for the collection People, the compiler adds indexers for First(Text), Last(Text), and Age(Number). Using this indexer the above query can be written quite compactly as:

People.First("John")

Figure 4:
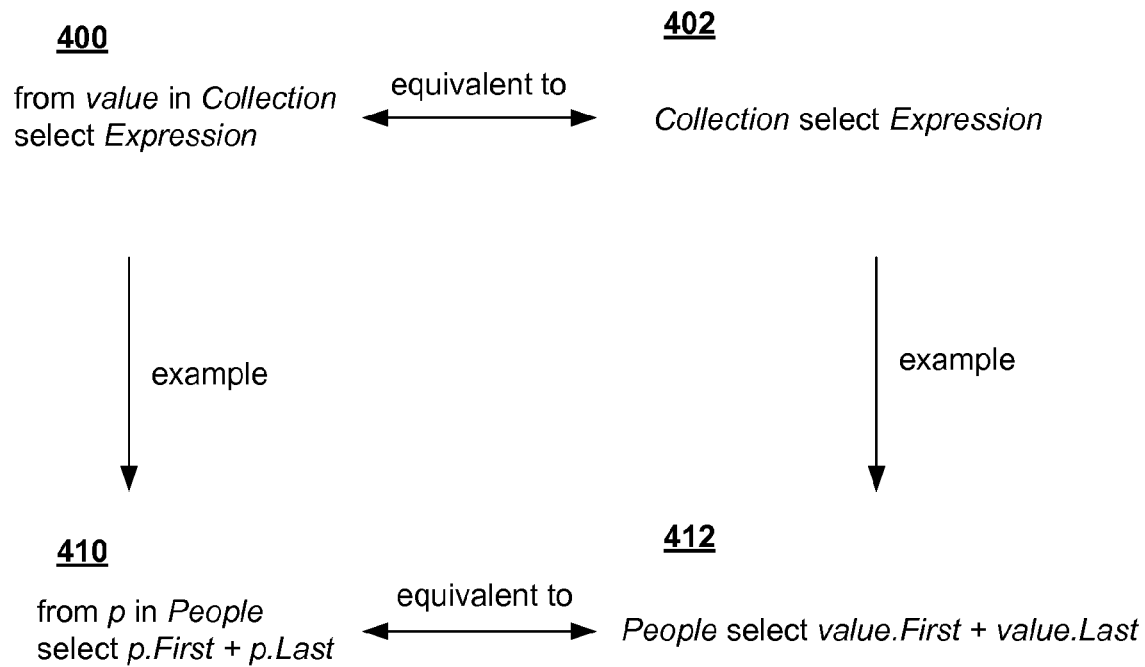
FIG. 4 is illustrative of a compact selection operation in accordance with a syntax of a programming language in various embodiments.

FIG. 4 is illustrative of a compact selection operation in accordance with a syntax of a programming language in various embodiments. Like the "where" filter operator, with D, the select or selection query operator is available as an infix operator. Considering the query 410:

from p in People
   select p.First+p.Last the select expression is computed over each member of the collection and returns the result. Using the infix select of a declarative programming language as provided herein, query 410 can be written equivalently as query 402:

People select value.First+value.Last

In this regard, the select operator takes a collection on the left and an arbitrary expression on the right. As with where, select introduces the keyword identifier value that ranges over each element in the collection. The select operator maps the expression over each element in the collection and returns the result. Accordingly, compact expression 402:

Collection select Expression is exactly equivalent to expression 400:
   from value in Collection
   select Expression One use of the select operator is to extract a single field as follows:

People select value.First

Referring to the example where the collection People has members First and Last, the compiler adds accessors to the collection so single fields can be extracted directly as People.First and People.Last.

Each of these short cuts saves a few keystrokes, which is convenient; however, as one can appreciate, the true benefit of these features becomes apparent on large or complex queries implemented across large or complex data. The compact syntax better enables a developer of source code to specify what data is desired in an efficient manner independent of the underlying data storage mechanisms.

Figure 5:
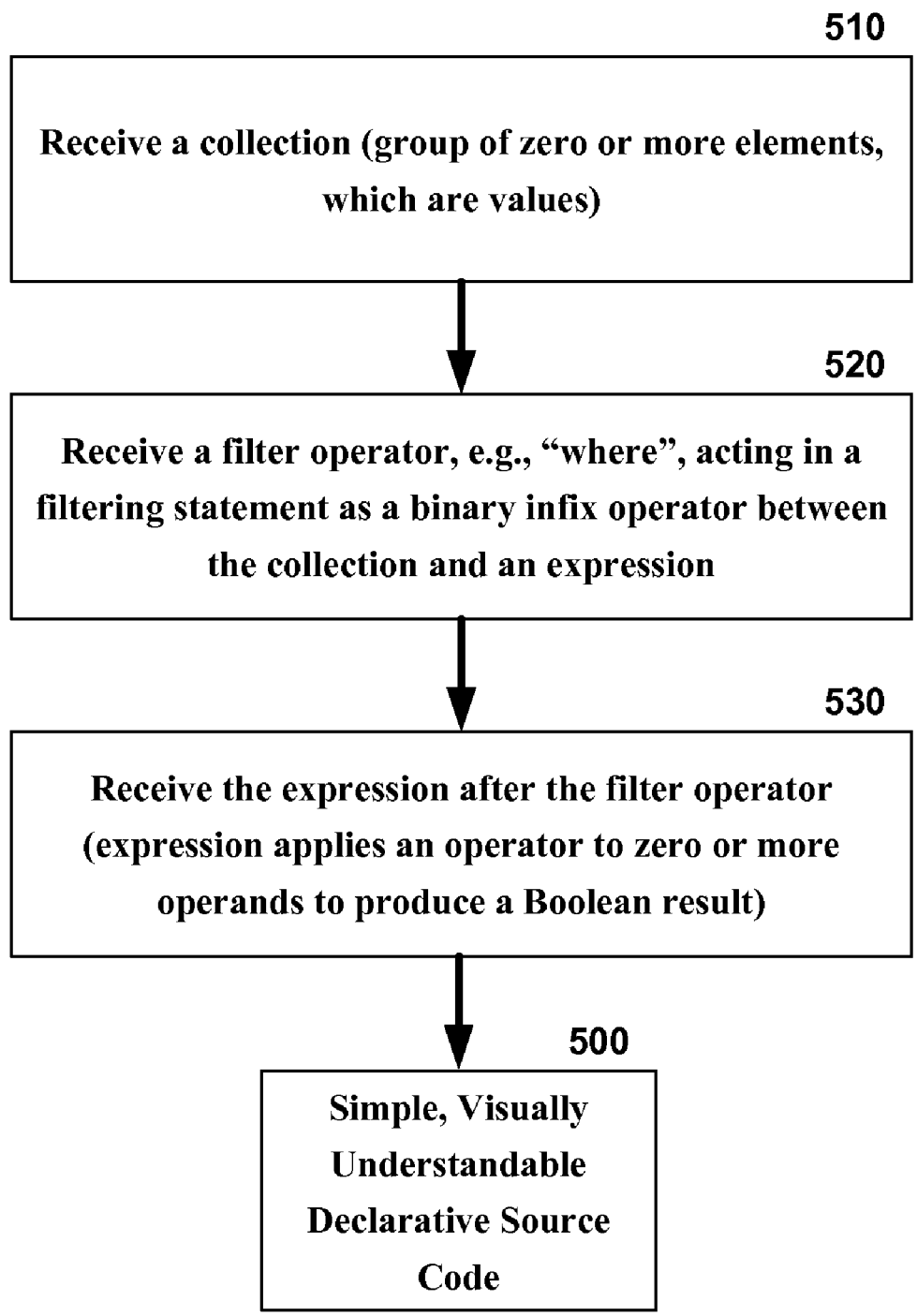
FIGS. 5 and 6 are flow diagrams illustrating exemplary aspects of compact filtering and selection querying programming constructs in accordance with various embodiments.
Figure 6:
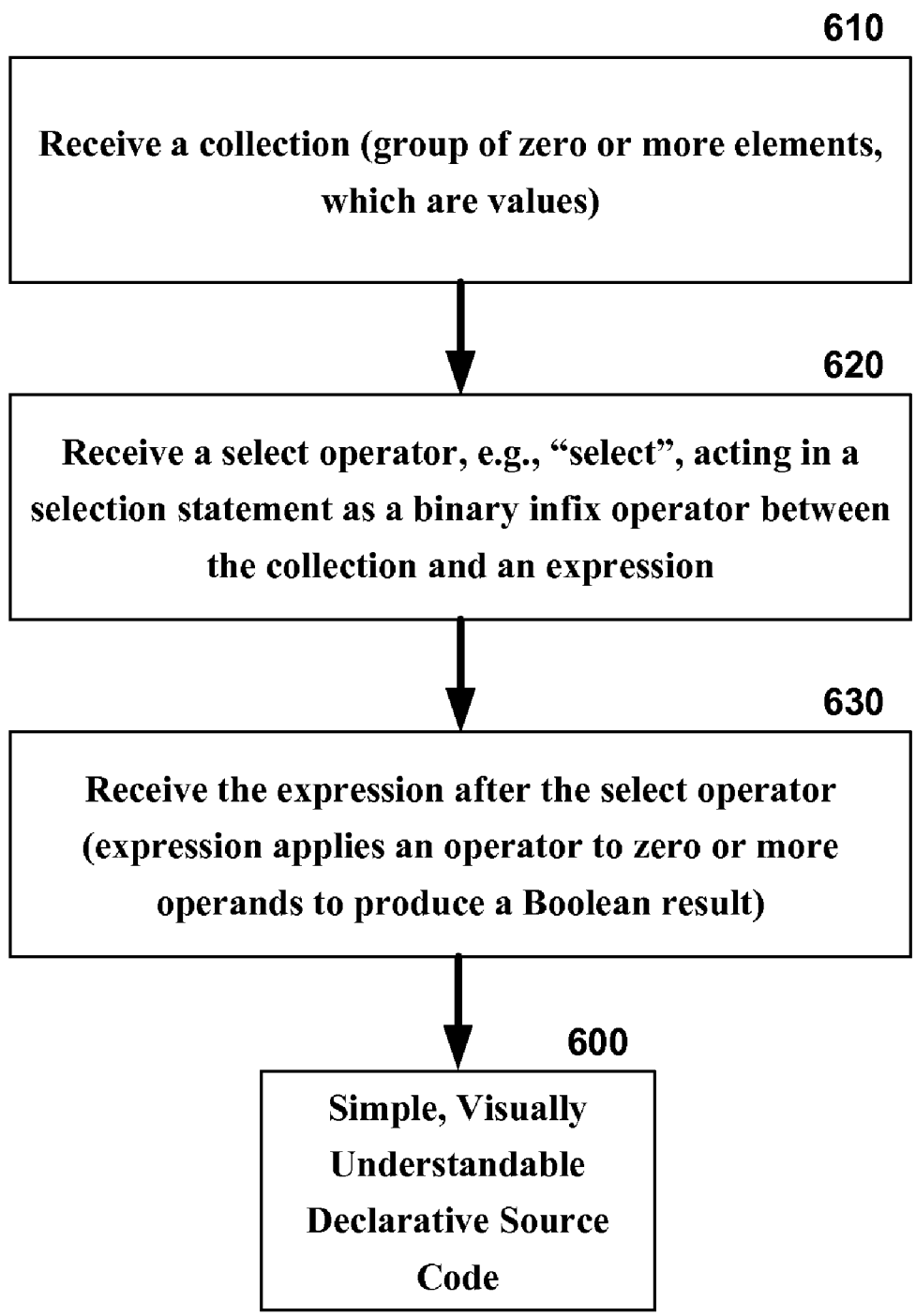
Figure 8:
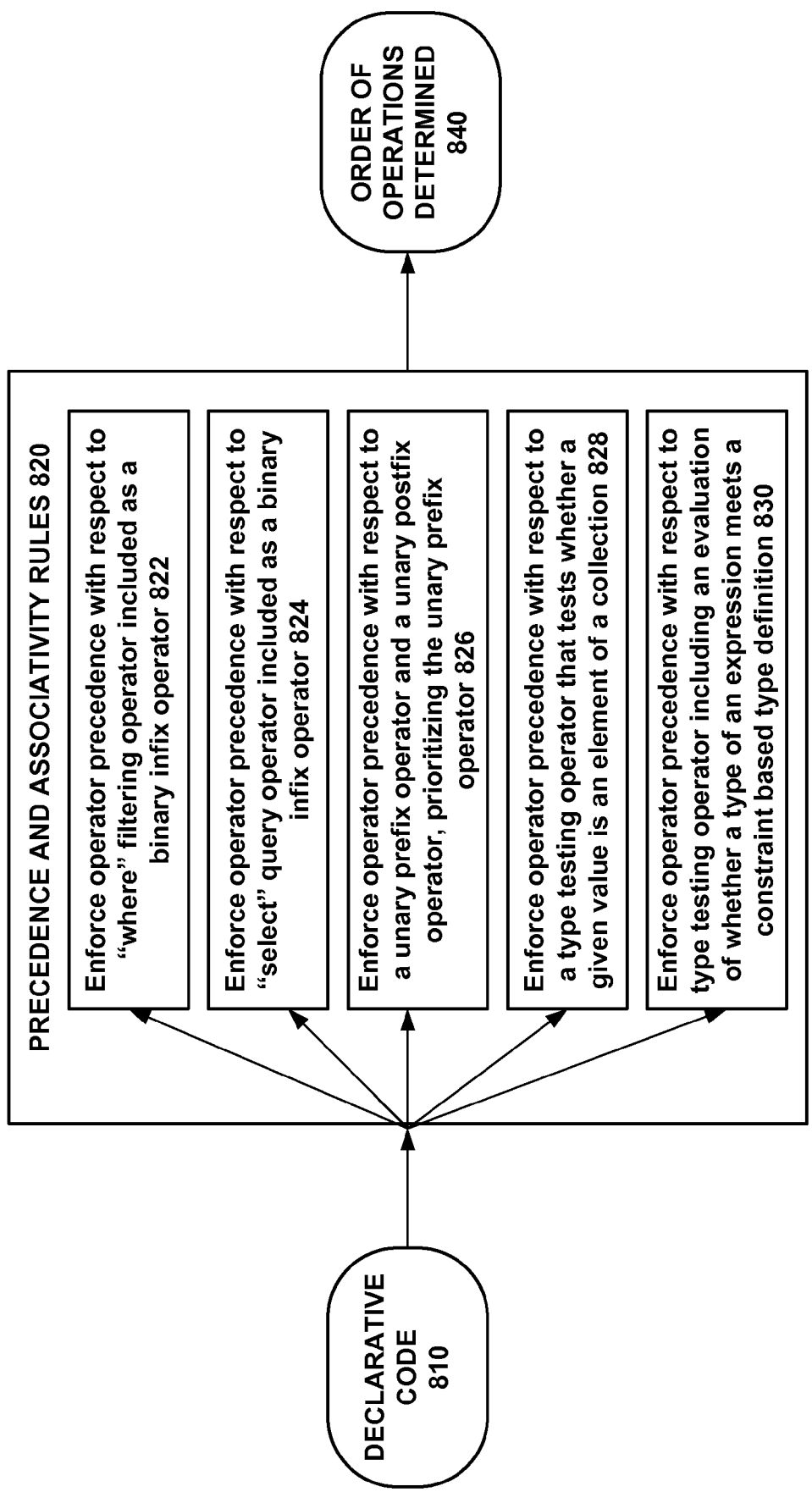
FIG. 8 is a block diagram illustrating exemplary non-limiting aspects of operator precedence applied to a declarative programming language in various embodiments.

FIGS. 5 and 6 are flow diagrams illustrating exemplary aspects of compact filtering and selection querying programming constructs in accordance with various embodiments. FIG. 5 generally illustrates a method for generating a programming module with a declarative programming language, such as the D programming language. At 510, computing device receives textual input of a declarative source code in memory including receiving a filtering statement for filtering over a data store including receipt of a collection. At 520, in addition, the filtering statement includes a filter operator such as the "where" filter operator in which the "where" filter operator acts as a binary infix operator between the collection and an expression that follows the filter operator. At 530, the expression following the filter operator is received, where the expression applies an operator to zero or more operands to produce a Boolean result. The benefit of the above described filter infix operator is simple, visually understandable declarative source code 500.

FIG. 6 generally illustrates another method for generating a programming module with a declarative programming language, such as the D programming language. At 610, computing device receives textual input of a declarative source code in memory including receiving a select statement for selecting data from a data store including receipt of a collection. At 620, in addition to the collection, the select statement includes a select operator such as the "select" selection operator in which the "select" selection operator acts as a binary infix operator between the collection and an expression that follows the selection operator. At 630, the expression following the selection operator is received, where the expression applies an operator to zero or more operands to produce a Boolean result. Again, the benefit of the above described filter infix operator is simple, visually understandable declarative source code 600.

With respect to operator precedence and associativity, as described in the background, when an expression contains multiple operators, the precedence of the operators controls the order in which the individual operators are evaluated. With D language, operator precedence is one of the non-limiting features that enables a compact and expressive syntax. For instance, the operator I enables compact query statements such as:

People select value.First|People select value.Last which obtains all first and last names of the collection People without requiring parentheses.

For a basic example of precedence, the expression x+y*z is evaluated as x+(y*z) because the * operator has higher precedence than +. FIG. 7 illustrates operator precedence of a declarative programming language in accordance with various embodiments and also adopted by the D programming language.

The table of FIG. 7 summarizes all operators of the D programming language in order of precedence from highest to lowest (from top to bottom), and some new categories and operators are reflected not taken into account in conventional precedence rules. The categories take precedence in the following order as shown in FIG. 7: Primary 100, Unary Prefix 102, Multiplicity (unary postfix) 104, Multiplicative 106, Additive 108, Shift 110, Relational and Type Testing 112, Equality 114, Bitwise And, Intersection 116, Bitwise Exclusive Or 118, Bitwise Or, Union 120, Logical And (conjunction) 122, Logical Or (disjunction) 124, Null Coalescing 126, Conditional 128, Query Comprehension 130, Where 132 and Select 134.

D defines a set of built-in operators that are specific to collections. The in operator is one of them, which tests whether a given value is an element of the collection. The result of the in operator is a Logical value that indicates whether the value is (true) or is not (false) an element of the collection. For example, these expressions:

$$1 \text{ in } \{1, 2, 3\}$$
$$!(1 \text{ in } \{\text{"Hello"}, 9\})$$

both result in true.

When an operand occurs between two operators with the same precedence, the associativity of the operators controls the order in which the operations are performed. Binary operators are left associative, that is, operations are performed left to right. For example, x+y+z is evaluated as (x+y)+z.

Precedence and associativity can be controlled using parentheses. For example, x+y*z first multiplies y by z and then adds the result to x, but (x+y)*z first adds x and y and then multiplies the result by z.

The operators &, | are overloaded to mean intersection and union in addition to their usual meanings as bitwise and, and bitwise or. With this new meaning, the precedence has changed to allow them to be used over queries without parentheses.

For example,
from p in People where p.Name="Bill" select p| from p in People
where p.Name="Mary" select p
parses as $$(\text{from } p \text{ in People where } p.\text{Name="Bill" select } p)|$$
$$(\text{from } p \text{ in People where } p.\text{Name="Mary" select } p)$$

Some non-limiting aspects of order of precedence that can be applied to the D programming language include enforcing any one or more of the following precedence rules: (1) enforcing operator precedence with respect to a filtering operator included in a construct as a binary infix operator, (2) enforcing operator precedence with respect to a select operator included in a construct as a binary infix operator, (3) in the context of a general purpose programming language (independent of specific domains) enforcing operator precedence with respect to a unary prefix operator and a unary postfix operator, prioritizing the unary prefix operator, (4) enforcing operator precedence with respect to a type testing operator that tests whether a given value is an element of a collection or (5) enforcing operator precedence with respect to a type testing operator including an evaluation of whether a type of an expression meets a constraint based type definition.

Exemplary Declarative Programming Language

For the avoidance of doubt, the additional context provided in this subsection regarding a declarative programming language, such as the D programming language, is to be considered non-exhaustive and non-limiting. The particular example snippets of pseudo-code set forth below are for illustrative and explanatory purposes only, and are not to be considered limiting on the embodiments of the compact syntax for a data scripting language described above in various detail.

Figure 9:
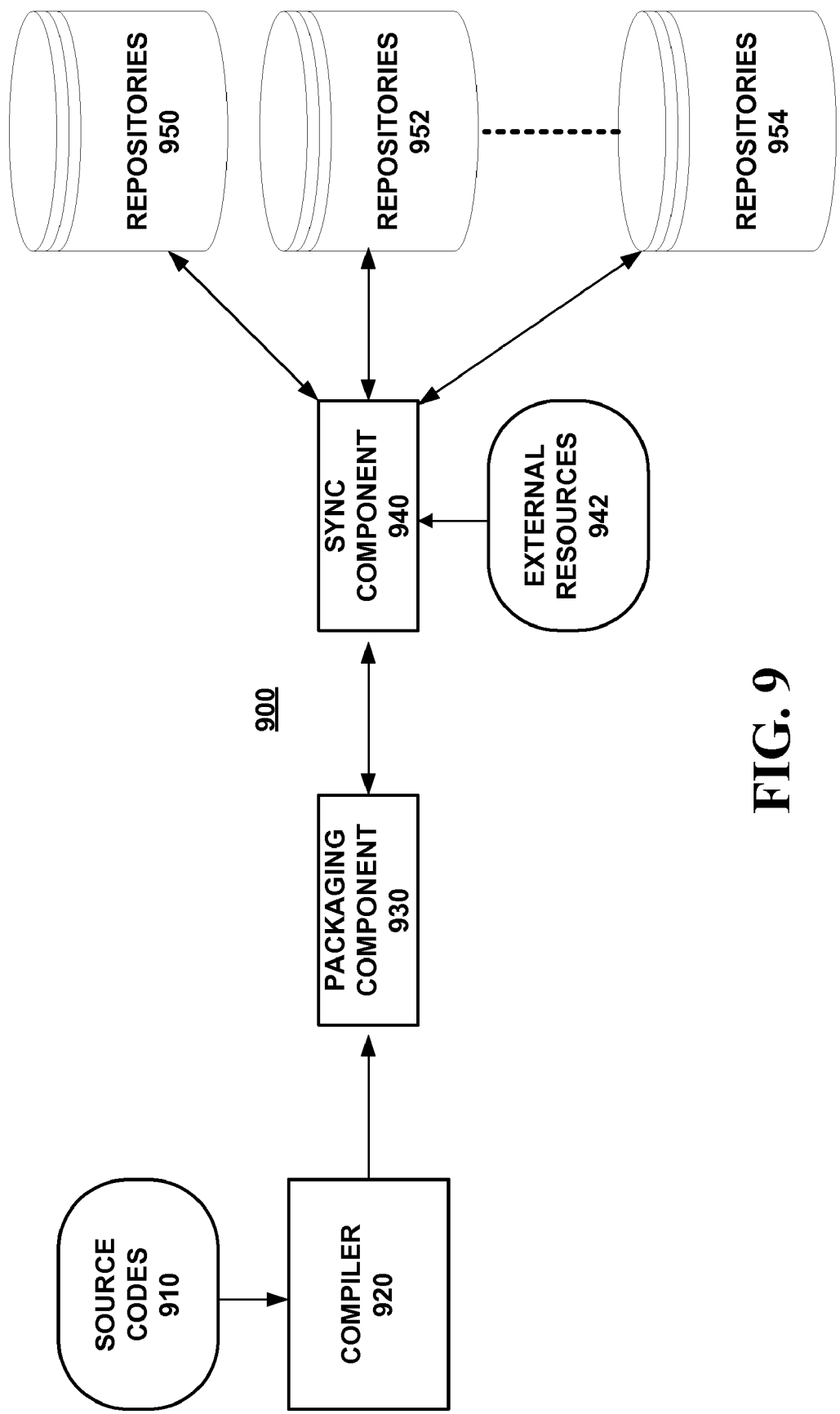
FIG. 9 is an exemplary process chain for a declarative model defined by a representative programming language in accordance with various embodiments.

In FIG. 9, an exemplary process chain for a declarative model is provided, such as a model based on the D programming language. As illustrated, process chain 900 may include a coupling of compiler 920, packaging component 930, synchronization component 940, and a plurality of repositories 950, 952, . . . , 954. Within such embodiment, a source code 910 input to compiler 920 represents a declarative execution model authored in a declarative programming language, such as the D programming language. With the D programming language, for instance, the execution model embodied by source code 910 advantageously follows constraint-based typing, or structural typing, and/or advantageously embodies an order-independent or unordered execution model to simplify the development of code.

Compiler 920 processes source codes 910 and can generate a post-processed definition for each source code. Although other systems perform compilation down to an imperative format, the declarative format of the source code, while transformed, is preserved. Packaging component 930 packages the post-processed definitions as image files, such as D_Image files in the case of the D programming language, which are installable into particular repositories 950, 952, . . . , 954. Image files include definitions of necessary metadata and extensible storage to store multiple transformed artifacts together with their declarative source model. For example, packaging component 930 may set particular metadata properties and store the declarative source definition together with compiler output artifacts as content parts in an image file.

With the D programming language, the packaging format employed by packaging component 930 is conformable with the ECMA Open Packaging Conventions (OPC) standards. One of ordinary skill would readily appreciate that this standard intrinsically offers features like compression, grouping, signing, and the like. This standard also defines a public programming model (API), which allows an image file to be manipulated via standard programming tools. For example, in the .NET Framework, the API is defined within the "System.IO.Packaging" namespace.

Synchronization component 940 is a tool that can be used to manage image files. For example, synchronization component 940 may take an image file as an input and link it with a set of referenced image files. In between or afterwards, there could be several supporting tools (like re-writers, optimizers, etc.) operating over the image file by extracting packaged artifacts, processing them and adding more artifacts in the same image file. These tools may also manipulate some metadata of the image file to change the state of the image file, e.g., digitally signing an image file to ensure its integrity and security.

Next, a deployment utility deploys the image file and an installation tool installs it into a running execution environment within repositories 950, 952, . . . , 954. Once an image file is deployed, it may be subject to various post deployment tasks including export, discovery, servicing, versioning, uninstall and more. With the D programming language, the packaging format offers support for all these operations while still meeting enterprise-level industry requirements like security, extensibility, scalability and performance. In one embodiment, repositories 950 can be a collection of relational database management systems (RDBMS), however any storage can be accommodated.

Figure 10:
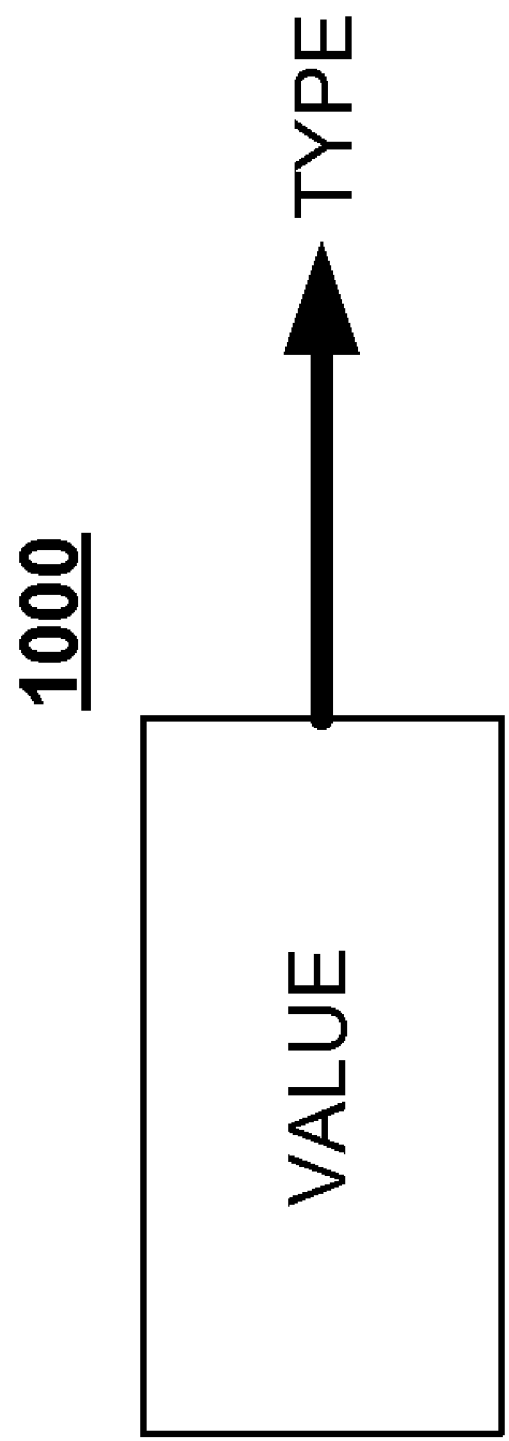
FIG. 10 is an illustration of a type system associated with a record-oriented execution model.
Figure 11:
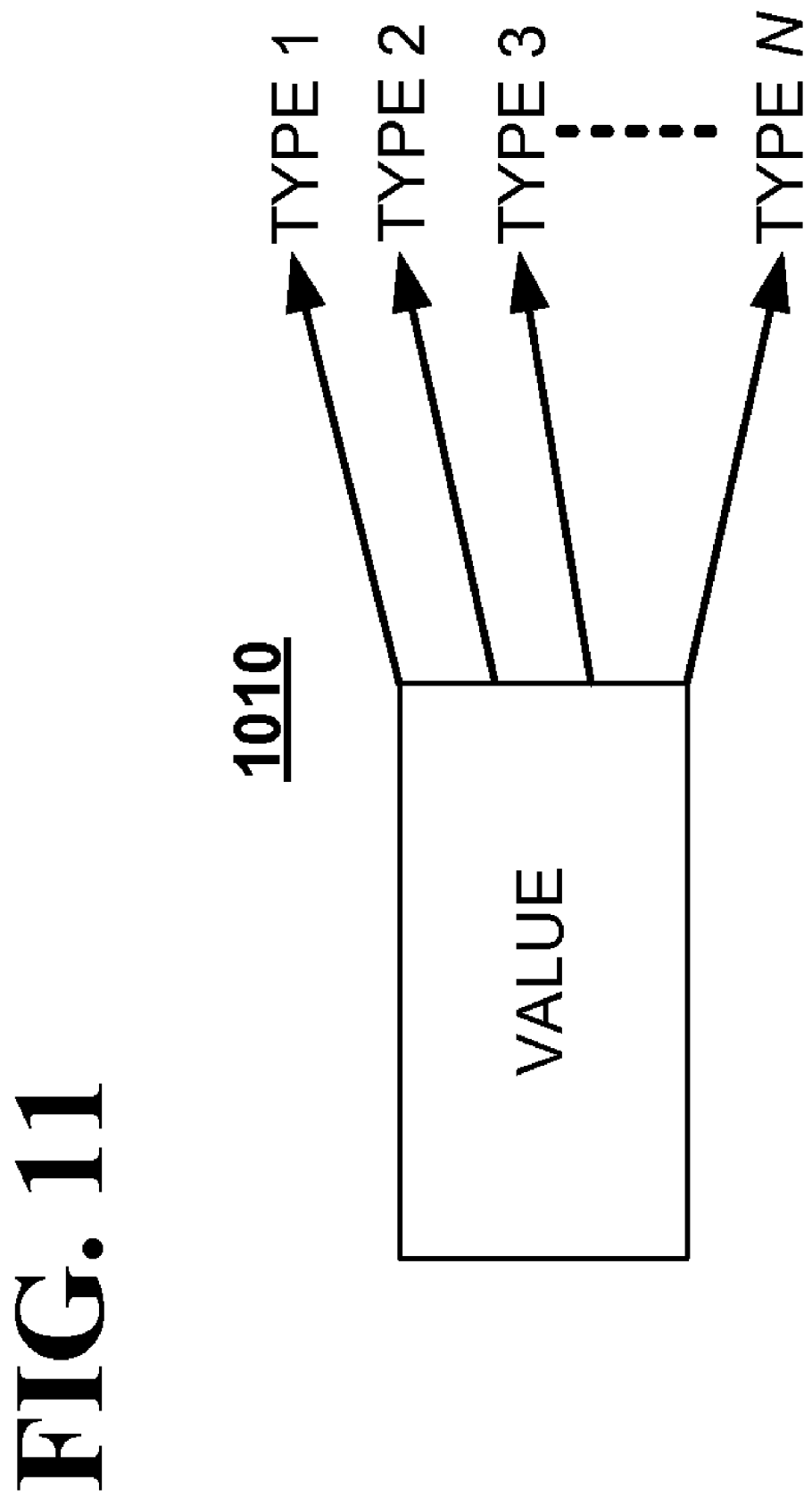
FIG. 11 is a non-limiting illustration of a type system associated with a constraint-based execution model according to an embodiment of the invention.

In one embodiment, the methods described herein are operable with a programming language having a constraint-based type system. Such a constraint-based system provides functionality not simply available with traditional, nominal type systems. In FIGS. 10-11, a nominally typed execution system is compared to a constraint-based typed execution system according to an embodiment of the invention. As illustrated, the nominal system 1000 assigns a particular type for every value, whereas values in constraint-based system 1010 may conform with any of an infinite number of types.

For an illustration of the contrast between a nominally-typed execution model and a constraint-based typed model according to a declarative programming language described herein, such as the D programming language, exemplary code for type declarations of each model are compared below.

First, with respect to a nominally-typed execution model the following exemplary C# code is illustrative:

```
class A
{
    public string Bar;
    public int Foo;
}
class B
```

```
{
    public string Bar;
    public int Foo;
}
```

For this declaration, a rigid type-value relationship exists in which A and B values are considered incomparable even if the values of their fields, Bar and Foo, are identical.

In contrast, with respect to a constraint-based model, the following exemplary D code (discussed in more detail below) is illustrative of how objects can conform to a number of types:

```
type A { Bar : Text; Foo : Integer; }
type B { Bar : Text; Foo : Integer; }
```

For this declaration, the type-value relationship is much more flexible as all values that conform to type A also conform to B, and vice-versa. Moreover, types in a constraint-based model may be layered on top of each other, which provides flexibility that can be useful, e.g., for programming across various RDBMSs. Indeed, because types in a constraint-based model initially include all values in the universe, a particular value is conformable with all types in which the value does not violate a constraint codified in the type's declaration. The set of values conformable with type defined by the declaration type T:Text where value<128 thus includes "all values in the universe" that do not violate the "Integer" constraint or the "value<128" constraint.

Thus, in one embodiment, the programming language of the source code is a purely declarative language that includes a constraint-based type system as described above, such as implemented in the D programming language.

In another embodiment, the method described herein is also operable with a programming language having an order-independent, or unordered, execution model. Similar to the above described constraint-based execution model, such an order-independent execution model provides flexibility that can be useful, e.g., for programming across various RDBMSs.

Figure 12:
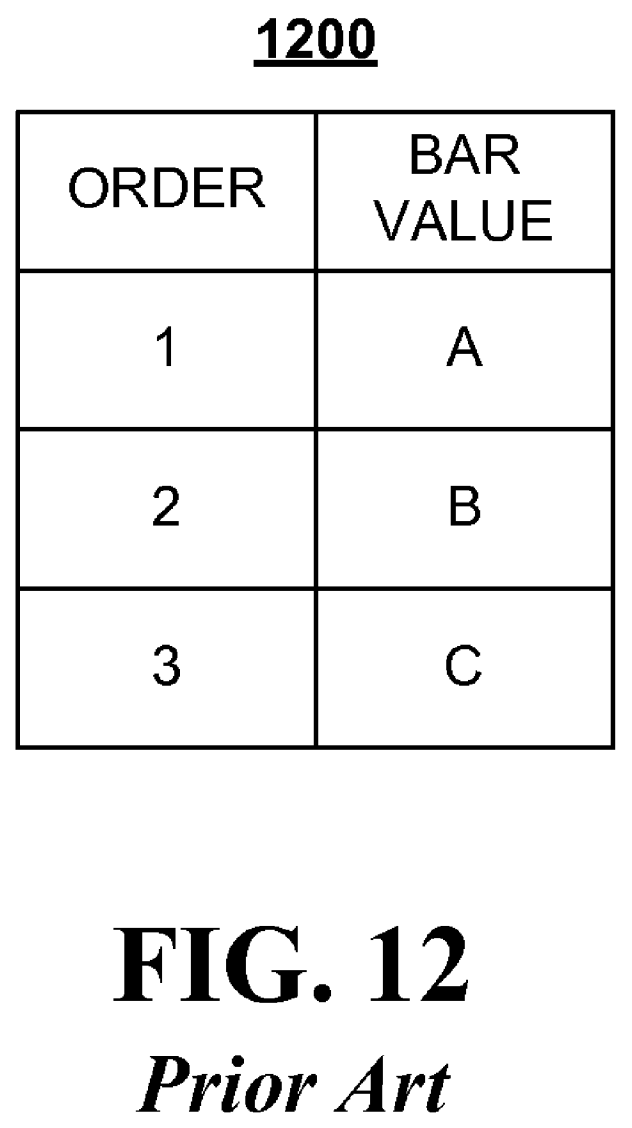
Figure 13:
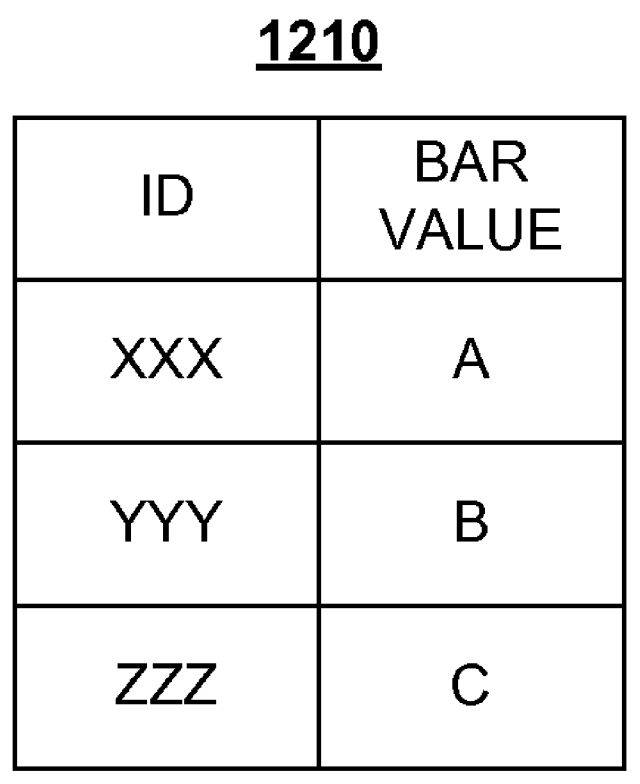

In FIGS. 12-13, for illustrative purposes, a data storage abstraction according to an ordered execution model is compared to a data storage abstraction according to an order-independent execution model. For example, data storage abstraction 1200 of FIG. 12 represents a list Foo created according to an ordered execution model, whereas data abstraction 1210 of FIG. 13 represents a similar list Foo created by an order-independent execution model.

As illustrated, each of data storage abstractions 1200 and 1210 include a set of three Bar values (i.e., "1", "2", and "3"). However, data storage abstraction 1200 requires these Bar values to be entered/listed in a particular order, whereas data storage abstraction 1210 has no such requirement. Instead, data storage abstraction 1210 simply assigns an ID to each Bar value, wherein the order that these Bar values were entered/listed is unobservable to the targeted repository. For instance, data storage abstraction 1210 may have thus resulted from the following order-independent code:

```
f: Foo* = {Bar = "1"};
f: Foo* = {Bar = "2"};
f: Foo* = {Bar = "3"};
```

However, data storage abstraction 1210 may have also resulted from the following code:

```
f: Foo* = {Bar = "3"};
f: Foo* = {Bar = "1"};
f: Foo* = {Bar = "2"};
```

And each of the two codes above are functionally equivalent to the following code:

```
f:Foo*={{Bar="2"}, {Bar="3"}, {Bar="1"}};
```

An exemplary declarative language that is compatible with the above described constraint based typing and unordered execution model is the D programming language, sometimes referred to herein as "D" for convenience, which was developed by the assignee of the present invention. However, in addition to D, it is to be understood that other similar declarative programming languages may be used, and that the utility of the invention is not limited to any single programming language, where any one or more of the embodiments of the compact syntax for a declarative programming language described above apply. In this regard, some additional context regarding D is provided below.

As mentioned, D is a declarative language for working with data. D lets users determine how they want to structure and query their data using a convenient textual syntax that is both authorable and readable. In one non-limiting aspect, a D program includes of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, a D program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

As a declarative language, D does not mandate how data is stored or accessed, nor does it mandate a specific implementation technology (in contrast to a domain specific language such as XAML). Rather, D was designed to allow users to write down what they want from their data without having to specify how those desires are met against a given technology or platform. That stated, D in no way prohibits implementations from providing rich declarative or imperative support for controlling how D constructs are represented and executed in a given environment, and thus, enables rich development flexibility.

D builds on three basic concepts: values, types, and extents. These three concepts can be defined as follows: 1) a value is data that conforms to the rules of the D language, 2) a type describes a set of values, and 3) an extent provides dynamic storage for values.

In general, D separates the typing of data from the storage/extent of the data. A given type can be used to describe data from multiple extents as well as to describe the results of a calculation. This allows users to start writing down types first and decide where to put or calculate the corresponding values later.

On the topic of determining where to put values, the D language does not specify how an implementation maps a declared extent to an external store such as an RDBMS. However, D was designed to make such implementations possible and is compatible with the relational model.

With respect to data management, D is a functional language that does not have constructs for changing the contents of an extent, however, D anticipates that the contents of an extent can change via external (to D) stimuli and optionally, D can be modified to provide declarative constructs for updating data.

It is often desirable to write down how to categorize values for the purposes of validation or allocation. In D, values are categorized using types, wherein a D type describes a collection of acceptable or conformant values. Moreover, D types are used to constrain which values may appear in a particular context (e.g., an operand, a storage location).

D allows types to be used as collections. For example, the "in" operator can be used to test whether a value conforms to a given type, such as:

```
1 in Number
"Hello, world" in Text
```

It should be noted that the names of built-in types are available directly in the D language. New names for types, however, may also be introduced using type declarations. For example, the type declaration below introduces the type name "My Text" as a synonym for the "Text" simple type:

type [My Text]:Text;

With this type name now available, the following code may be written:

"Hello, world" in [My Text]

While it is useful to introduce custom names for an existing type, it is even more useful to apply a predicate to an underlying type, such as:

type SmallText:Text where value.Count<7;

In this example, the universe of possible "Text" values has been constrained to those in which the value contains less than seven characters. Accordingly, the following statements hold true for this type definition:

```
"Terse" in SmallText
!("Verbose" in SmallText)
Type declarations compose:
type TinyText : SmallText where value.Count < 6;
```

However, in this example, this declaration is equivalent to the following:

type TinyText:Text where value.Count<6;

It is noted that the name of the type exists so a D declaration or expression can refer to it. Any number of names can be assigned to the same type (e.g., Text where value.Count<7) and a given value either conforms to all of them or to none of them. For example, consider this example:

```
type A : Number where value < 100;
type B : Number where value < 100:
```

Given these two type definitions, both of the following expressions:

```
1 in A
1 in B
``` will evaluate to true. If the following third type is introduced:
   type C:Number where value>0;
the following can be stated:
   1 in C A general principle of D is that a given value can conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, D has some notion of the expected type of that value based on the declared result type for the operator/function being applied. For example, the result of the logical and operator (&&) is declared to be conformant with type "Logical."

It is occasionally useful (or even required) to apply additional constraints to a given value—typically to use that value in another context that has differing requirements. For example, consider the following type definition:
   type SuperPositive:Number where value>5;

Assuming that there is a function named "CalcIt" that is declared to accept a value of type "SuperPositive" as an operand, it is desirable to allow expressions like this in D:

```
CalcIt(20)
CalcIt(42 + 99)
``` and prohibit expressions like this:

```
CalcIt(-1)
CalcIt(4)
```

In fact, D does exactly what is wanted for these four examples. This is because these expressions express their operands in terms of built-in operators over constants. All of the information needed to determine the validity of the expressions is readily available the moment the D source text for the expression is encountered at little cost.

However, if the expression draws upon dynamic sources of data and/or user-defined functions, the type ascription operator is used to assert that a value will conform to a given type.

To understand how the type ascription operator works with values, a second function, "GetVowelCount," is assumed that is declared to accept an operand of type "Text" and return a value of type "Number" that indicates the number of vowels in the operand.

Since it is unknown based on the declaration of "GetVowelCount" whether its results will be greater than five or not, the following expression is thus not a legal D expression:
   CalcIt(GetVowelCount(someTextVariable))

The expression is not legal because the declared result type (Number) of "GetVowelCount" includes values that do not conform to the declared operand type of "CalcIt" (SuperPositive). This expression can be presumed to have been written in error.

However, this expression can be rewritten to the following (legal) expression using the type ascription operator:
   CalcIt((GetVowelCount(someTextVariable):SuperPositive))

By this expression, D is informed that there is enough understanding of the "GetVowelCount" function to know that a value that conforms to the type "SuperPositive" will be obtained. In short, the programmer is telling D that he/she knows what D is doing.

However, if the programmer does not know, e.g., if the programmer misjudged how the "GetVowelCount" function works, a particular evaluation may result in a negative number. Because the "CalcIt" function was declared to only accept values that conform to "SuperPositive," the system will ensure that all values passed to it are greater than five. To ensure this constraint is never violated, the system may inject a dynamic constraint test that has a potential to fail when evaluated. This failure will not occur when the D source text is first processed (as was the case with CalcIt(-1))—rather it will occur when the expression is actually evaluated.

In this regard, D implementations typically attempt to report any constraint violations before the first expression in a D document is evaluated. This is called static enforcement and implementations will manifest this much like a syntax error. However, some constraints can only be enforced against live data and therefore require dynamic enforcement.

In this respect, D make it easy for users to write down their intention and put the burden on the D implementation to "make it work." Optionally, to allow a particular D document to be used in diverse environments, a fully featured D implementation can be configurable to reject D documents that rely on dynamic enforcement for correctness in order to reduce the performance and operational costs of dynamic constraint violations.

For further background regard, D, a type constructor can be defined for specifying collection types. The collection type constructor restricts the type and count of elements a collection may contain. All collection types are restrictions over the intrinsic type "Collection," e.g., all collection values conform to the following expressions:

```
{ } in Collection
{ 1, false } in Collection
! ("Hello" in Collection)
```

The last example demonstrates that the collection types do not overlap with the simple types. There is no value that conforms to both a collection type and a simple type.

A collection type constructor specifies both the type of element and the acceptable element count. The element count is typically specified using one of the three operators:

```
T* - zero or more Ts
T+ - one or more Ts
T#m..n - between m and n Ts.
```

The collection type constructors can either use Kleene operators or be written longhand as a constraint over the intrinsic type Collection—that is, the following type declarations describe the same set of collection values:

```
type SomeNumbers : Number+;
type TwoToFourNumbers : Number#2..4;
type ThreeNumbers : Number#3;
type FourOrMoreNumbers : Number#4..;
```

These types describe the same sets of values as these longhand definitions:

```
type SomeNumbers : Collection where value.Count >= 1
         && item in Number;
type TwoToFourNumbers : Collection where value.Count >= 2
         && value.Count <= 4
         && item in Number;
type ThreeNumbers : Collection where value.Count == 3
         && item in Number;
type FourOrMoreNumbers : Collection where value.Count >= 4
         && item in Number;
```

Independent of which form is used to declare the types, the following expressions can be stated:

```
!({ } in TwoToFourNumbers)
!({ "One", "Two", "Three" } in TwoToFourNumbers)
{ 1, 2, 3 } in TwoToFourNumbers
{ 1, 2, 3 } in ThreeNumbers
{ 1, 2, 3, 4, 5 } in FourOrMoreNumbers
```

The collection type constructors compose with the "where" operator, allowing the following type check to succeed:

{1, 2} in (Number where value<3)* where value.Count % 2==0

It is noted that the inner "where" operator applies to elements of the collection, and the outer "where" operator applies to the collection itself.

Just as collection type constructors can be used to specify what kinds of collections are valid in a given context, the same can be done for entities using entity types.

In this regard, an entity type declares the expected members for a set of entity values. The members of an entity type can be declared either as fields or as calculated values. The value of a field is stored; the value of a calculated value is computed. Entity types are restrictions over the Entity type, which is defined in the D standard library.

The following is a simple entity type:

type MyEntity:Language.Entity;

The type "MyEntity" does not declare any fields. In D, entity types are open in that entity values that conform to the type may contain fields whose names are not declared in the type. Thus, the following type test:

{X=100, Y=200} in MyEntity will evaluate to true, as the "MyEntity" type says nothing about fields named X and Y.

Entity types can contain one or more field declarations. At a minimum, a field declaration states the name of the expected field, e.g.:

type Point {X; Y;}

This type definition describes the set of entities that contain at least fields named X and Y irrespective of the values of those fields, which means that the following type tests evaluate to true:

```
{ X = 100, Y = 200 } in Point
{ X = 100, Y = 200, Z = 300 } in Point // more fields than expected OK
! ({ X = 100 } in Point)        // not enough fields - not OK
{ X = true, Y = "Hello, world" } in Point
```

The last example demonstrates that the "Point" type does not constrain the values of the X and Y fields, i.e., any value is allowed. A new type that constrains the values of X and Y to numeric values is illustrated as follows:

```
type NumericPoint {
    X : Number;
    Y : Number where value > 0;
}
```

It is noted that type ascription syntax is used to assert that the value of the X and Y fields should conform to the type "Number." With this in place, the following expressions evaluate to true:

```
{ X = 100, Y = 200 } in NumericPoint
{ X = 100, Y = 200, Z = 300 } in NumericPoint
! ({ X = true, Y = "Hello, world" } in NumericPoint)
! ({ X = 0, Y = 0 } in NumericPoint)
```

As was seen in the discussion of simple types, the name of the type exists so that D declarations and expressions can refer to it. That is why both of the following type tests succeed:

```
{ X = 100, Y = 200 } in NumericPoint
{ X = 100, Y = 200 } in Point
``` even though the definitions of NumericPoint and Point are independent.

Fields in D are named units of storage that hold values. D allows the developer to initialize the value of a field as part of an entity initializer. However, D does not specify any mechanism for changing the value of a field once it is initialized. In D, it is assumed that any changes to field values happen outside the scope of D.

A field declaration can indicate that there is a default value for the field. Field declarations that have a default value do not require conformant entities to have a corresponding field specified (such field declarations are sometimes called optional fields). For example, with respect to the following type definition:

```
type Point3d {
    X : Number;
    Y : Number;
    Z = -1 : Number; // default value of negative one
}
```

Since the Z field has a default value, the following type test will succeed:

{X=100, Y=200} in Point3d

Moreover, if a type ascription operator is applied to the value as follows:

({X=100, Y=200}:Point3d)

then the Z field can be accessed as follows:

({X=100, Y=200}:Point3d).Z in which case this expression will yield the value −1.

In another non-limiting aspect, if a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and { } for the collection.

For example, considering the following type:

```
type PointND {
    X : Number;
    Y : Number;
    Z : Number?;        // Z is optional
    BeyondZ : Number*;  // BeyondZ is optional too
}
```

Then, again, the following type test will succeed:
{X=100, Y=200} in PointND
and ascribing the "PointND" to the value yields these defaults:

```
({ X = 100, Y = 200 } : PointND).Z == null
({ X = 100, Y = 200 } : PointND).BeyondZ == { }
```

The choice of using a zero-to-one collection or nullable type vs. an explicit default value to model optional fields typically comes down to one of style.

Calculated values are named expressions whose values are calculated rather than stored. An example of a type that declares such a calculated value is:

```
type PointPlus {
    X : Number;
    Y : Number;
    // a calculated value
    IsHigh( ) : Logical { Y > 0; }
}
```

Note that unlike field declarations, which end in a semicolon, calculated value declarations end with the expression surrounded by braces.

Like field declarations, a calculated value declaration may omit the type ascription, like this example:

```
type PointPlus {
    X : Number;
    Y : Number;
    // a calculated value with no type ascription
    InMagicQuadrant( ) { IsHigh && X > 0; }
    IsHigh( ) : Logical { Y > 0; }
}
```

In another non-limiting aspect, when no type is explicitly ascribed to a calculated value, D can infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values defined and used above did not require any additional information to calculate their results other than the entity value itself. A calculated value may optionally declare a list of named parameters whose actual values must be specified when using the calculated value in an expression. The following is an example of a calculated value that requires parameters:

```
type PointPlus {
    X : Number;
    Y : Number;
    // a calculated value that requires a parameter
    WithinBounds(radius : Number) : Logical {
        X * X + Y * Y <= radius * radius;
    }
    InMagicQuadrant( ) { IsHigh && X > 0; }
    IsHigh( ) : Logical { Y > 0; }
}
```

To use this calculated value in an expression, one provides values for the two parameters as follows:

({X=100,Y=200}:PointPlus).WithinBounds(50)

When calculating the value of "WithinBounds," D binds the value 50 to the symbol radius, which causes the "WithinBounds" calculated value to evaluate to false.

It is noted with D that both calculated values and default values for fields are part of the type definition, not part of the values that conform to the type. For example, considering these three type definitions:

```
type Point {
    X : Number;
    Y : Number;
}
type RichPoint {
    X : Number;
    Y : Number;
    Z = −1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Since RichPoint and WeirdPoint only have two required fields (X and Y), the following can be stated:

```
{ X=1, Y=2 } in RichPoint
{ X=1, Y=2 } in WeirdPoint
```

However, the "IsHigh" calculated value is only available when one of these two types is ascribed to the entity value:

```
({ X=1, Y=2 } : RichPoint).IsHigh == true
({ X=1, Y=2 } : WeirdPoint).IsHigh == false
```

Because the calculated value is purely part of the type and not the value, when the ascription is chained, such as follows:

```
(({X=1,Y=2}:RichPoint):WeirdPoint).IsHigh==false
``` then, the outer-most ascription determines which function is called.

A similar principle is at play with respect to how default values work. It is again noted the default value is part of the type, not the entity value. Thus, when the following expression is written:

```
({X=1,Y=2}:RichPoint).Z==-1
``` the underlying entity value still only contains two field values (1 and 2 for X and Y, respectively). In this regard, where default values differ from calculated values, ascriptions are chained. For example, considering the following expression:

```
(({X=1,Y=2}:RichPoint):WeirdPoint).Z==-1
```

Since the "RichPoint" ascription is applied first, the resultant entity has a field named Z having a value of −1; however, there is no storage allocated for the value, i.e., it is part of the type's interpretation of the value. Accordingly, when the "Weird-Point" ascription is applied, it is applied to the result of the first ascription, which does have a field named Z, so that value is used to specify the value for Z. The default value specified by "WeirdPoint" is thus not needed.

Like all types, a constraint may be applied to an entity type using the "where" operator. Consider the following D type definition:

```
type HighPoint {
    X : Number;
    Y : Number;
} where X < Y;
```

In this example, all values that conform to the type "High-Point" are guaranteed to have an X value that is less than the Y value. That means that the following expressions:

```
{ X = 100, Y = 200 } in HighPoint
! ({ X = 300, Y = 200 } in HighPoint)
``` both evaluate to true.

Moreover, with respect to the following type definitions:

```
type Point {
    X : Number;
    Y : Number;
}
type Visual {
    Opacity : Number;
}
type VisualPoint {
    DotSize : Number;
} where value in Point && value in Visual;
``` the third type, "VisualPoint," names the set of entity values that have at least the numeric fields X, Y, Opacity, and Dot-Size.

Since it is a common desire to factor member declarations into smaller pieces that can be composed, D also provides explicit syntax support for factoring. For instance, the "VisualPoint" type definition can be rewritten using that syntax:

```
type VisualPoint : Point, Visual {
    DotSize : Number;
}
```

To be clear, this is shorthand for the long-hand definition above that used a constraint expression. Furthermore, both this shorthand definition and long-hand definition are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

D can also extend LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, the following query extracts people under 30 from a defined collection of "People":

from p in People
   where p.Age=30
   select p

An equivalent query can be written:

People where value.Age=30

The "where" operator takes a collection on the left and a Boolean expression on the right. The "where" operator introduces a keyword identifier value in to the scope of the Boolean expression that is bound to each member of the collection. The resulting collection contains the members for which the expression is true. Thus, the expression:

Collection where Expression is equivalent to:
   from value in Collection
   where Expression
   select value The D compiler adds indexer members on collections with strongly typed elements. For the collection "People," for instance, the compiler might add indexers for "First(Text)," "Last(Text)," and "Age(Number)."

Accordingly, the statement:

Collection.Field(Expression)

is equivalent to:

from value in Collection
   where Field==Expression
   select value

"Select" is also available as an infix operator. With respect to the following simple query:

from p in People
   select p.First+p.Last the "select" expression is computed over each member of the collection and returns the result. Using the infix "select" the query can be written equivalently as:

People select value.First+value.Last

The "select" operator takes a collection on the left and an arbitrary expression on the right. As with "where," "select" introduces the keyword identifier value that ranges over each element in the collection. The "select" operator maps the expression over each element in the collection and returns the result. For another example, the statement:

Collection select Expression is equivalent to the following:

from value in Collection
select Expression

A trivial use of the "select" operator is to extract a single field:

People select value.First

The compiler adds accessors to the collection so single fields can be extracted directly as "People.First" and "People.Last."

To write a legal D document, all source text appears in the context of a module definition. A module defines a top-level namespace for any type names that are defined. A module also defines a scope for defining extents that will store actual values, as well as calculated values.

The following is a simple example of a module definition:

```
module Geometry {
  // declare a type
  type Point {
    X : Integer; Y : Integer;
  }
  // declare some extents
  Points : Point*;
  Origin : Point;
  // declare a calculated value
  TotalPointCount { Points.Count + 1; }
}
```

In this example, the module defines one type named "Geometry.Point." This type describes what point values will look like, but does not define any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast, fields declared at module-scope name actual storage that must be mapped by an implementation in order to load and interpret the module.

In addition, modules can refer to declarations in other modules by using an import directive to name the module containing the referenced declarations. For a declaration to be referenced by other modules, the declaration is explicitly exported using an export directive.

For example, considering the following module:

```
module MyModule {
  import HerModule; // declares HerType
  export MyType1;
  export MyExtent1;
  type MyType1 : Logical*;
  type MyType2 : HerType;
  MyExtent1 : Number*;
  MyExtent2 : HerType;
}
```

It is noted that only "MyType1" and "MyExtent1" are visible to other modules, which makes the following definition of "HerModule" legal:

```
module HerModule {
  import MyModule; // declares MyType1 and MyExtent1
  export HerType;
  type HerType : Text where value.Count < 100;
  type Private : Number where !(value in MyExtent1);
  SomeStorage : MyType1;
}
```

As this example shows, modules may have circular dependencies.

The types of the D language are divided into two main categories: intrinsic types and derived types. An intrinsic type is a type that cannot be defined using D language constructs but rather is defined entirely in the D language specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in D source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

D offers a broad range of options in defining types. Any expression which returns a collection can be declared as a type. The type predicates for entities and collections are expressions and fit this form. A type declaration may explicitly enumerate its members or be composed of other types.

Another distinction is between a structurally typed language, like D, and a nominally typed language. A type in D is a specification for a set of values. Two types are the same if the exact same collection of values conforms to both regardless of the name of the types. It is not required that a type be named to be used. A type expression is allowed wherever a type reference is required. Types in D are simply expressions that return collections.

If every value that conforms to type A also conforms to type B, then A is a subtype of B (and B is a super-type of A). Subtyping is transitive, that is, if A is a subtype of B and B is a subtype of C, then A is a subtype of C (and C is a super-type of A). Subtyping is reflexive, that is, A is a (vacuous) subtype of A (and A is a super-type of A).

Types are considered collections of all values that satisfy the type predicate. For that reason, any operation on a collection can be applied to a type and a type can be manipulated with expressions like any other collection value.

D provides two primary means for values to come into existence: calculated values and stored values (a.k.a. fields). Calculated and stored values may occur with both module and entity declarations and are scoped by their container. A computed value is derived from evaluating an expression that is typically defined as part of D source text. In contrast, a field stores a value and the contents of the field may change over time.

Exemplary Networked and Distributed Environments

One of ordinary skill in the art can appreciate that the various embodiments for a compact syntax for a declarative program described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 14:
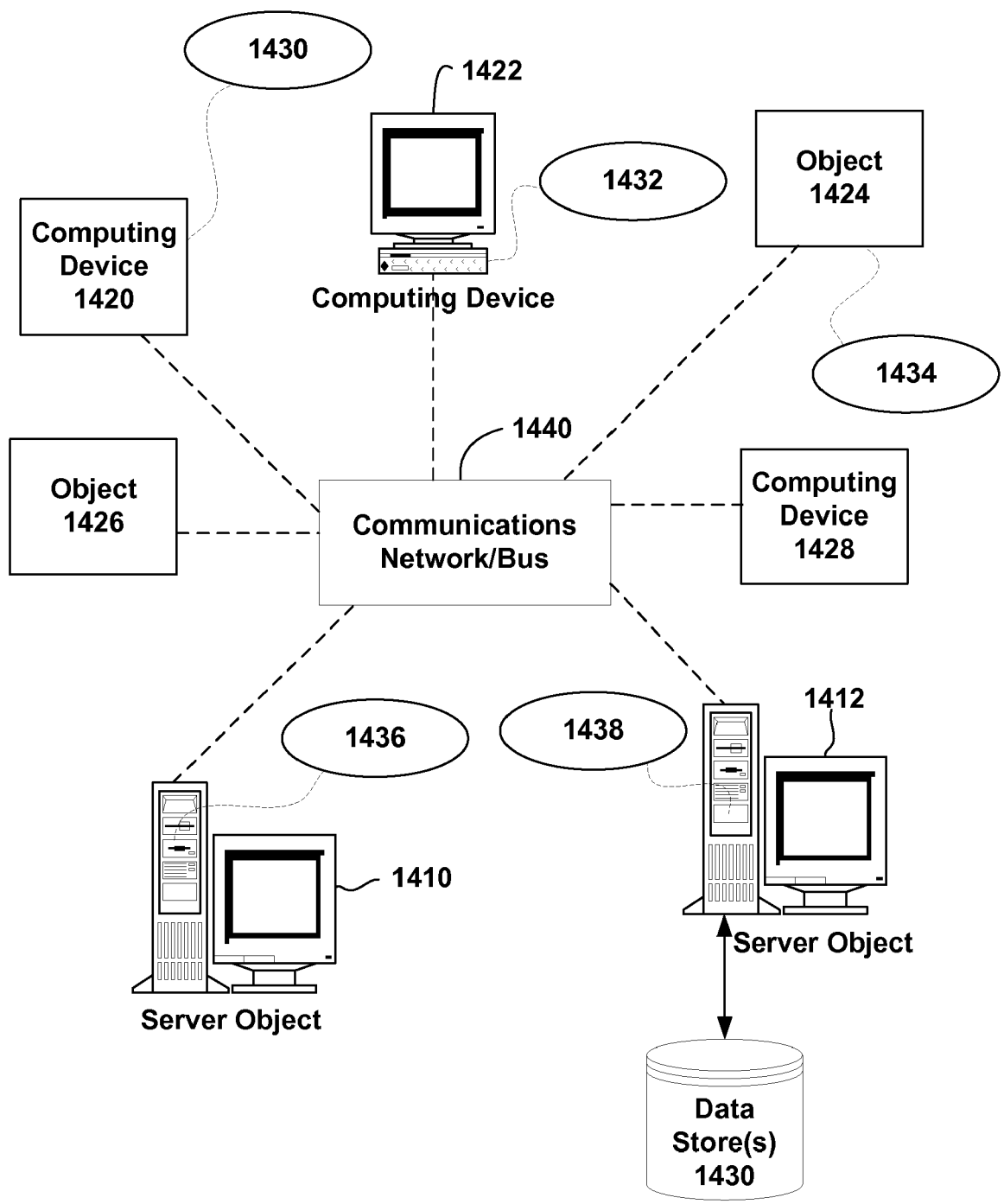
FIG. 14 is a block diagram representing exemplary non-limiting networked environments in which various embodiments described herein can be implemented.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that objects 1410, 1412, etc. and computing objects or devices 1420, 1422, 1424, 1426, 1428, etc. may comprise different devices, such as PDAs, audio/video devices, mobile phones, MP3 players, personal computers, laptops, etc.

Each object 1410, 1412, etc. and computing objects or devices 1420, 1422, 1424, 1426, 1428, etc. can communicate with one or more other objects 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each object 1410, 1412, etc. or 1420, 1422, 1424, 1426, 1428, etc. can also contain an application, such as applications 1430, 1432, 1434, 1436, 1438, that might make use of an API, or other object, software, firmware and/or hardware, suitable for communication with, processing for, or implementation of the a compact syntax for a declarative program provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to using the compact syntax for a declarative program as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computers 1420, 1422, 1424, 1426, 1428, etc. can be thought of as clients and computers 1410, 1412, etc. can be thought of as servers where servers 1410, 1412, etc. provide data services, such as receiving data from client computers 1420, 1422, 1424, 1426, 1428, etc., storing of data, processing of data, transmitting data to client computers 1420, 1422, 1424, 1426, 1428, etc., although any computer can be considered a client, a server, or both, depending on the circumstances. Any of these computing devices may be processing data, encoding data, querying data or requesting services or tasks that may implicate using the compact syntax for a declarative program as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to generating or consuming the compact syntax for a declarative program can be provided standalone, or distributed across multiple computing devices or objects.

In a network environment in which the communications network/bus 1440 is the Internet, for example, the servers 1410, 1412, etc. can be Web servers with which the clients 1420, 1422, 1424, 1426, 1428, etc. communicate via any of a number of known protocols, such as the hypertext transfer protocol (HTTP). Servers 1410, 1412, etc. may also serve as clients 1420, 1422, 1424, 1426, 1428, etc., as may be characteristic of a distributed computing environment.

Exemplary Computing Device

As mentioned, advantageously, the techniques described herein can be applied to any device where it is desirable to query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 15 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 15:
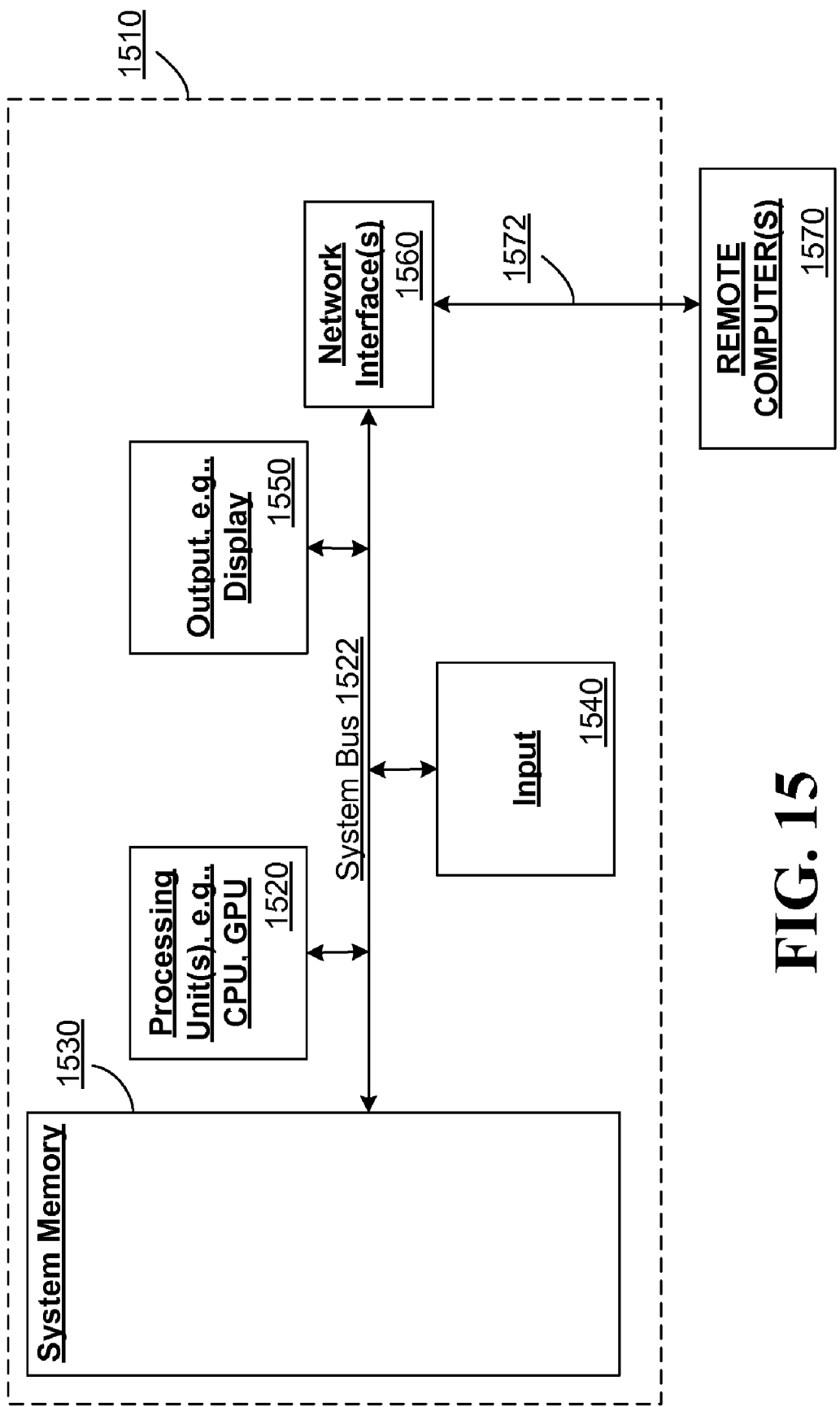
FIG. 15 is a block diagram representing an exemplary non-limiting computing system or operating environment in which one or more aspects of various embodiments described herein can be implemented.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither should the computing environment 1500 be interpreted as having any dependency or requirement relating to any one or combination of components illustrated in the exemplary operating environment 1500.

With reference to FIG. 15, an exemplary remote device for implementing one or more embodiments includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, memory 1530 may also include an operating system, application programs, other program modules, and program data.

A user can enter commands and information into the computer 1510 through input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to process queries over large scale data.

Also, there are multiple ways to implement the same or similar functionality, e.g., an appropriate API, tool kit, driver code, operating system, control, standalone or downloadable software object, etc. which enables applications and services to use the compact syntax for a declarative program. Thus, embodiments herein are contemplated from the standpoint of an API (or other software object), as well as from a software or hardware object that enable the generation, modification, or execution of programs based on a compact syntax for a declarative program. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method for generating at least one programming module with a declarative programming language, including:
   receiving, in a memory of a computing device, textual source code in the declarative programming language, wherein the textual source code includes a filtering statement that is processable into one or more machine-executable instructions for filtering elements of a data collection, and wherein receiving the textual source code includes:
      receiving a collection variable that represents the data collection, wherein the data collection includes a group of one or more elements;
      following receipt of the collection variable, receiving a filter operator, wherein the filter operator is binary infix operator; and
      following receipt of the filter operator, receiving an expression that specifies criteria for filtering the elements of the data collection,
   wherein the filtering statement is of the form "COL OPER EXP", wherein COL refers to the collection variable, OPER refers to the filter operator, and EXP refers to the expression.

2. The method of claim 1, wherein the expression is evaluable, for each element of the data collection, to a Boolean result.

3. The method of claim 1, wherein the filter operator includes a "where" filter operator.

4. The method of claim 1, wherein the declarative programming language is the "M" language.

5. The method of claim 1, wherein the expression includes at least one variable of a constraint-based type.

6. The method of claim 1, wherein the collection variable directly precedes the filter operator within the filtering statement.

7. The method of claim 1, further comprising:
   at least partially compiling the textual source code into machine-executable code that is executable to filter the data collection according to the expression.

8. A computer readable storage medium, not including a signal per se, comprising computer executable instructions at least partially compiled from source code of a declarative programming language, including:
   a set of instructions compiled from a selection statement of the source code that if executed selects specified elements of a data collection, wherein the selection statement of the source code comprises:
      a collection variable that represents the data collection, wherein the data collection includes a group of one or more elements;
      a selection operator that is a binary infix operator and that follows the collection variable; and
      an expression that specifies criteria for selecting the specified elements of the data collection,
   wherein the selection statement is of the form "COL OPER EXP", wherein COL refers to the collection variable, OPER refers to the selection operator, and EXP refers to the expression.

9. The computer readable storage medium of claim 8, wherein the expression is evaluable, for each element of the data collection, to an overall Boolean result.

10. The computer readable storage medium of claim 9, wherein the expression includes one or more nested expressions within the expression, and wherein each of the nested expressions are evaluable to intermediate Boolean results that are evaluable to the overall Boolean result.

11. The computer readable storage medium of claim 8, wherein the selection operator includes a "select" filter operator.

12. The computer readable storage medium of claim 8, wherein the expression is typeable according to a structural typing system.

13. The computer readable storage medium of claim 8, wherein the selection operator directly follows the collection variable in the selection statement.

14. The computer readable storage medium of claim 8, wherein the expression directly follows the selection operator in the selection statement.

15. A computer program product stored in a computer-readable storage medium, not including a signal per se, the computer program product generated based on compact computer programming constructs of a declarative programming language from a process that enforces operator precedence for the computer programming constructs, the process including any of:
   enforcing operator precedence with respect to a filtering operator, wherein the filtering operator is a binary infix operator used in a filtering statement of a form "FCOL FOPER FEXP", wherein FCOL refers to a collection to be filtered, FOPER refers to the filtering operator, and FEXP refers to an expression to be employed during filtration;
   enforcing operator precedence with respect to a selection operator, wherein the selection operator is a binary infix operator used in a selection statement of the form "SCOL SOPER SEXP", wherein SCOL refers to a collection from which elements are to be selected, SOPER refers to the selection operator, and SEXP refers to an expression to be employed during selection of elements;
   enforcing operator precedence with respect to priority of a unary prefix operator over a unary postfix operator;
   enforcing operator precedence with respect to a type testing operator that tests whether a given value is an element of a collection; or
   enforcing operator precedence with respect to a type ascription operator that defines a constraint for a programmer defined type.

16. The computer program product of claim 15, wherein the filtering operator includes a "where" filtering operator.

17. The computer program product of claim 15, wherein the selection operator includes a "select" selection operator.

18. The computer program product of claim 15, wherein the process for enforcing operator precedence includes evaluating precedence of an overloaded operator intersection and bitwise and operator that indicates associativity of query operations without parentheses.

19. The computer program product of claim 15, wherein the process of enforcing operator precedence with respect to a type ascription operator includes enforcing operator precedence with respect to a construct following syntax "type: constraint" where "type" is a programmer defined type and "constraint" is a constraint to be applied to the programmer defined type.

* * * * *